(No Model.)
R. J. SHAWHAN.
AUTOMATIC FOOT FOR TONGUELESS CULTIVATORS.
No. 358,414. Patented Feb. 22, 1887.
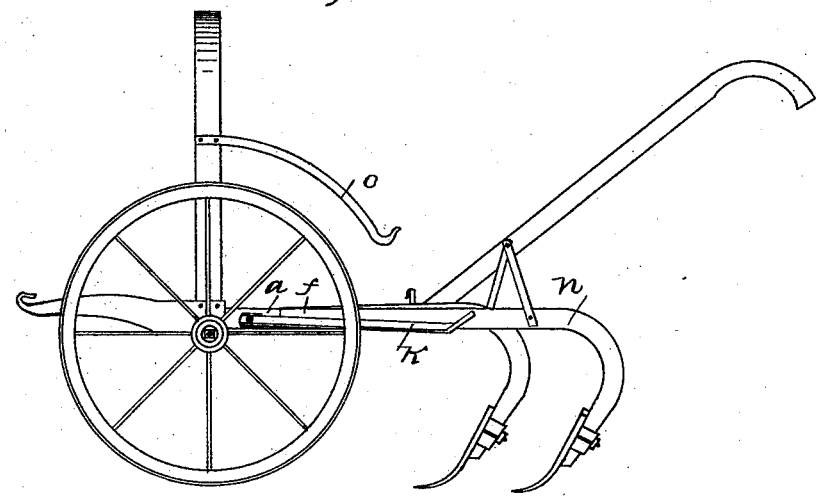
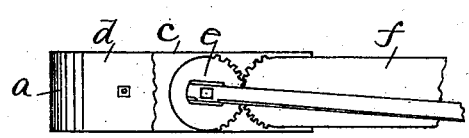
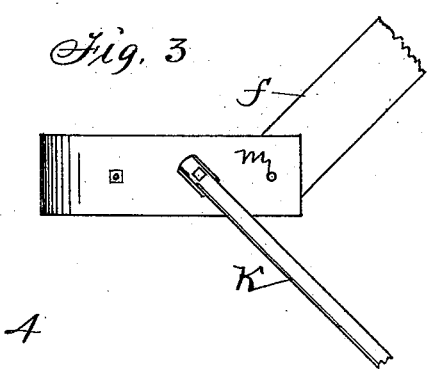
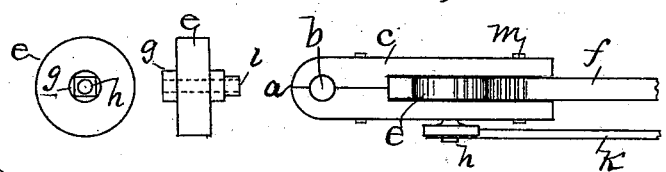
Witnesses:
R. H. Orwig
C. M. Stiles
Inventor:
Richard J. Shawhan,
By Thomas G. Orwig, Atty.

United States Patent Office.

RICHARD J. SHAWHAN, OF SWAN, ASSIGNOR OF ONE-FOURTH TO GEORGE R. HOWARD, OF RUNNELLS, IOWA.

AUTOMATIC FOOT FOR TONGUELESS CULTIVATORS.

SPECIFICATION forming part of Letters Patent No. 358,414, dated February 22, 1887.

Application filed July 24, 1886. Serial No. 208,949. (No model.)

*To all whom it may concern:*

Be it known that I, RICHARD J. SHAWHAN, a citizen of the United States, residing at Swan, in the county of Marion and State of Iowa, have invented a new and useful Automatic Knuckle and Foot for Tongueless Corn-Plows, of which the following is a specification.

Heretofore feet or runners for tongueless corn-plows have been so connected with the plow that it was necessary to loosen screws and put them in place and again secure them by set-screws before the plows could be elevated to the hooks which hold them above the ground.

It is the purpose of my invention to so arrange these feet with the knuckle of the plow that when the plow is elevated to the hooks the feet will automatically drop to their places without the necessity of setting them by hand. This object I attain by the use of a pinion which is set in the knuckle, and which engages with cogs on the end of the plow-beam. To the axle of the pinion, which is cast integral with the pinion, are attached the feet, which turn downward by the rotation of the pinion whenever the plows are elevated, and form the usual resistance for steadying the plow.

My device is illustrated in the accompanying drawings, in which Figure 1 is a side view of a complete plow with my device attached. Fig. 2 is a broken side view of the knuckle and pinion in detail. Fig. 3 is a side view of the same with beam elevated and foot down; Fig. 4, an edge view of the same; Figs. 5 and 6, side and edge views of the pinions bearing the feet.

Similar letters refer to similar parts throughout the several views.

*a* is a knuckle of the ordinary form, with the hole *b* to receive the coupling-pin of the axle. The knuckle *a*, as shown in Fig. 4, is constructed in two parts, *c* and *d*, with their rear ends cut out, so as to receive the pinion *e* and end of plow-beam *f*. The pinion *e* is cast with cogs and a hollow integral axle, *g*, for receiving a bolt, *h*, which holds the foot *k* on the squared end *l* of the axle *g* on the outside of the knuckle *a*. The plow-beam *f* is pivoted in the knuckle at *m*, and is also made with cogs on its end, which engage with the cogs of the pinion *e*, thus rotating the latter, together with the foot *k*, whenever the beam is lowered or elevated.

Whenever the plows *n* are elevated to the hooks *o*, in going to and from the field or around the ends, the cogs at the end of the beam *f* rotate the pinion *e*, with foot *k*, downward, bringing the foot in contact with the ground, thus preventing the backward tipping or swaying of the plow. When the plows *n* are again lowered to the ground, their downward movement rotates the pinion backward and elevates the feet *k* to a position nearly parallel with the beam of the plow, thus carrying them entirely free from the ground and all obstacles.

I claim as my invention—

1. The combination of the foot *k*, the axles *l*, and the pinions *e*, to operate with the plow-beams *f*, substantially as set forth, for the purposes stated.

2. The combination of foot *k*, the axles *l*, the bolt *h*, and pinions *e*, with the toothed ends of plow-beams *f* and knuckles *a*, substantially as set forth.

3. The combination of plow-beams with cogs in their ends to engage with and automatically operate pinions in the knuckle, which pinions bear on their ends, outside of the knuckles, feet for steadying the plow, substantially as shown and described, for purposes stated.

RICHARD J. SHAWHAN.

Witnesses:
GEO. S. MERLES,
J. M. HUMELL.